(12) United States Patent
Guttmann et al.

(10) Patent No.: US 6,931,692 B2
(45) Date of Patent: Aug. 23, 2005

(54) KINGPIN-FREE CASTER ASSEMBLY

(75) Inventors: Craig J. Guttmann, Thornhill (CA); Sean Guttmann, Thornhill (CA); Peter DePinto, Brampton (CA); Csaba Lemak, Richmond Hill (CA)

(73) Assignee: Algood Casters Limited, Weston (CA)

( * ) Notice: Subject to any disclaimer, the term of this patent is extended or adjusted under 35 U.S.C. 154(b) by 0 days.

(21) Appl. No.: 10/464,112

(22) Filed: Jun. 19, 2003

(65) Prior Publication Data

US 2004/0134027 A1 Jul. 15, 2004

(30) Foreign Application Priority Data

Jan. 13, 2003 (CA) .............................................. 2416170

(51) Int. Cl.[7] .......................... B60B 33/00; A47B 91/06
(52) U.S. Cl. ............................. 16/45; 16/21; 16/31 R; 16/38
(58) Field of Search ............................. 16/45, 48, 20, 16/21, 37–39, 31 R, 31 A; 280/47.38, 642, 647, 650

(56) References Cited

U.S. PATENT DOCUMENTS

| | | | |
|---|---|---|---|
| 581,216 A | | 4/1897 | Merl |
| 1,743,143 A | * | 1/1930 | Johnson .......................... 16/21 |
| 1,752,030 A | * | 3/1930 | Roe ................................. 16/21 |
| 1,755,670 A | | 4/1930 | Hele-Shaw et al. |
| 1,809,609 A | * | 6/1931 | Turner ............................. 16/21 |
| 1,873,888 A | * | 8/1932 | Herold ............................ 16/21 |
| 1,896,978 A | * | 2/1933 | Hele-Shaw et al. ............. 16/21 |
| 1,912,795 A | * | 6/1933 | Rice et al. ....................... 16/21 |
| 1,931,469 A | * | 10/1933 | Davies .......................... 29/513 |
| 2,986,767 A | * | 6/1961 | Rice et al. ....................... 16/21 |
| 3,162,888 A | * | 12/1964 | Mobus ........................ 16/35 R |
| 3,317,257 A | | 5/1967 | Oddsen |
| 3,418,704 A | | 12/1968 | Oddsen |
| 3,633,982 A | | 1/1972 | Germann |
| 3,667,097 A | | 6/1972 | Germann |
| 3,703,020 A | * | 11/1972 | Skupas et al. ............... 16/31 R |
| 3,749,416 A | | 7/1973 | Asberg |
| 3,757,883 A | | 9/1973 | Asberg |
| 4,213,225 A | | 7/1980 | Timmer |
| 4,293,168 A | | 10/1981 | Timmer |
| 4,316,305 A | | 2/1982 | Seaford |
| 4,385,415 A | * | 5/1983 | Volz ............................... 16/29 |
| 4,409,715 A | | 10/1983 | Trimmer |
| 4,514,015 A | | 4/1985 | Sullivan |
| 4,554,704 A | | 11/1985 | Raffaeli |
| 5,002,404 A | | 3/1991 | Zernickel et al. |
| 5,263,226 A | * | 11/1993 | Roy et al. .................... 16/35 R |
| 5,943,735 A | * | 8/1999 | Walker et al. .................. 16/38 |

FOREIGN PATENT DOCUMENTS

| | | | | |
|---|---|---|---|---|
| DE | 3022990 A | * | 1/1982 | ........... B21D/53/88 |
| DE | 33 00 527 A1 | | 7/1984 | |
| DE | 3341063 A | * | 5/1985 | ........... B21D/53/10 |

* cited by examiner

*Primary Examiner*—Chuck Mah
(74) *Attorney, Agent, or Firm*—Riches, McKenzie & Herbert LLP

(57) ABSTRACT

A kingpin-free caster in which a plate is assembled onto a yoke with ball bearings therebetween and the plate is deformed in place upon the yoke to capture the ball bearings between the yoke and plate and couple the yoke and plate together against removal.

27 Claims, 17 Drawing Sheets

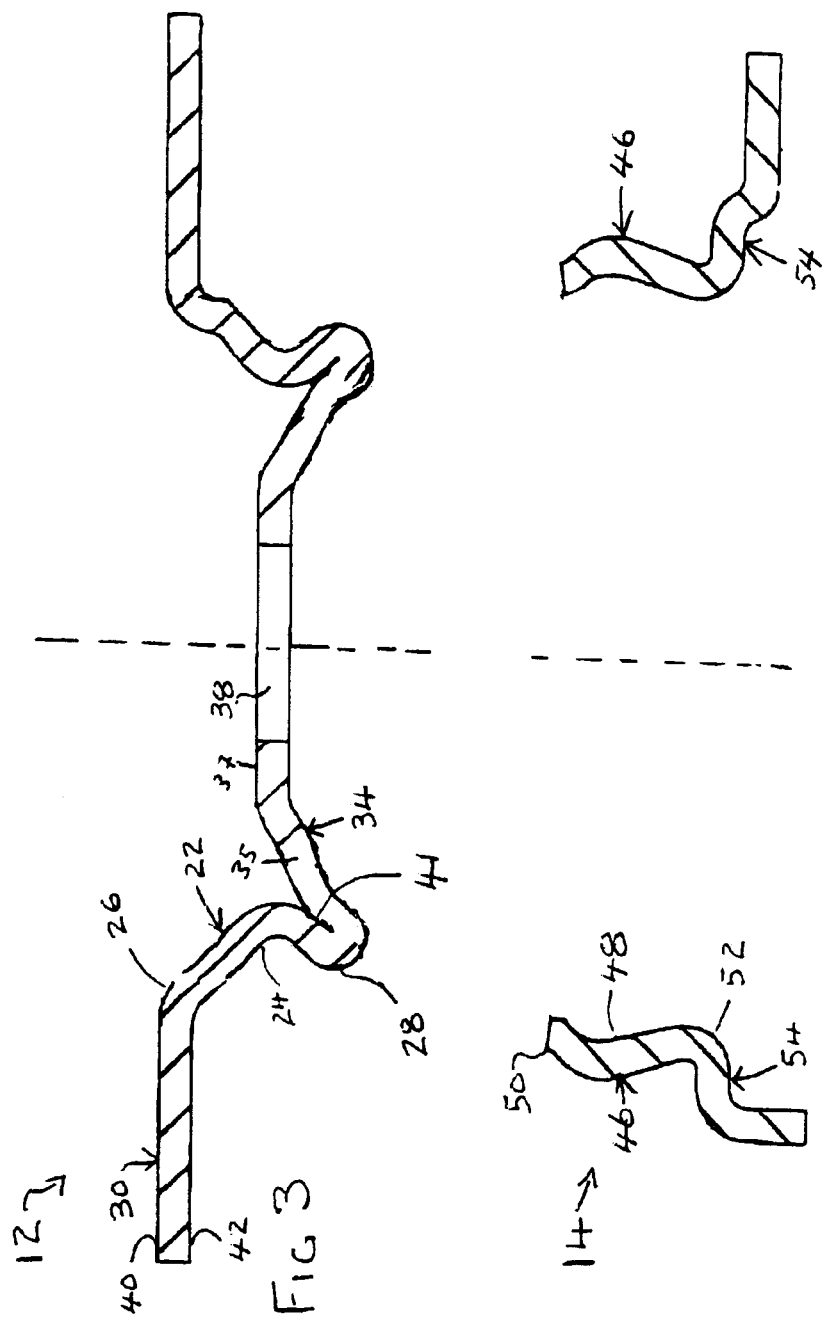

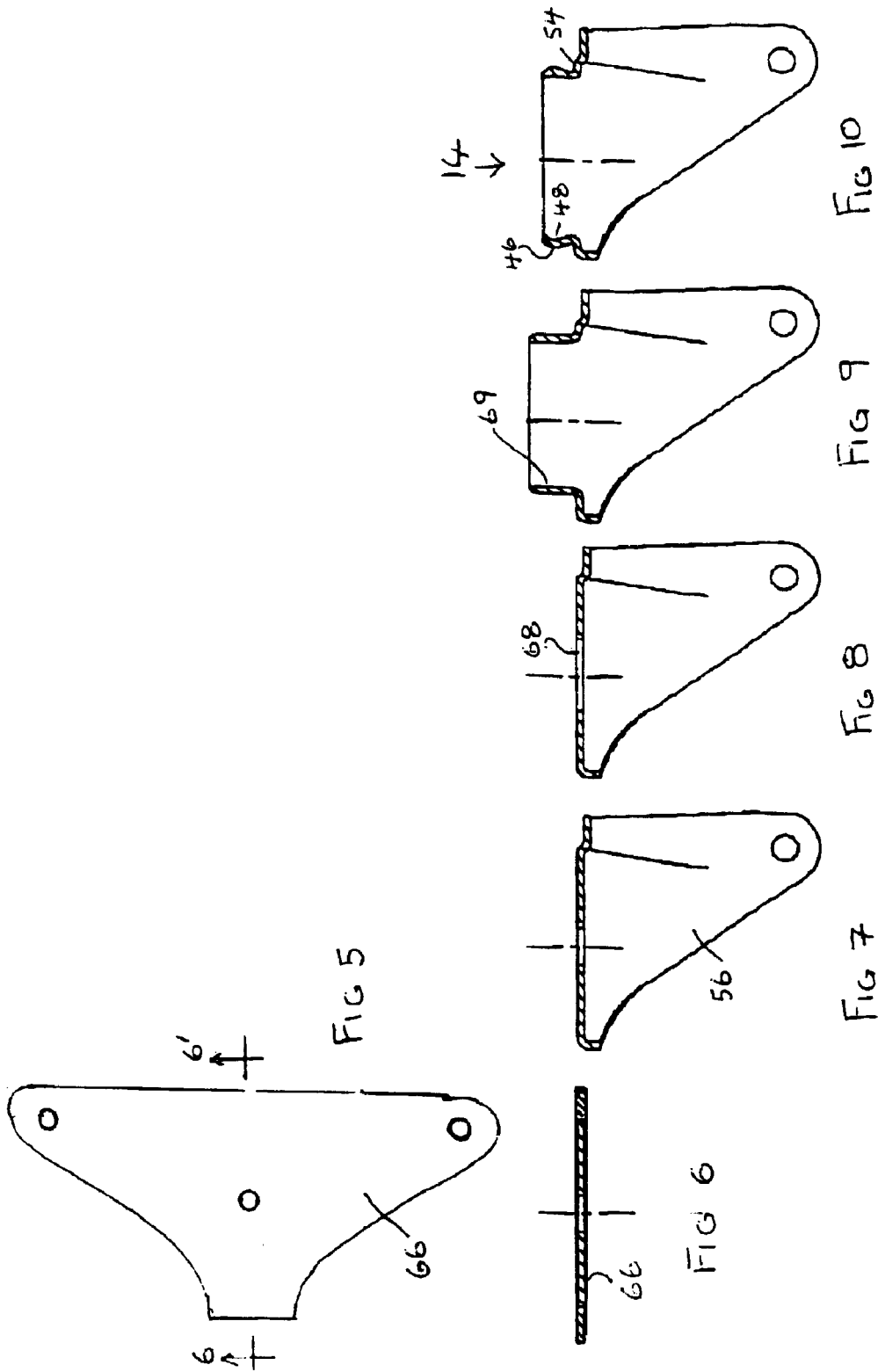

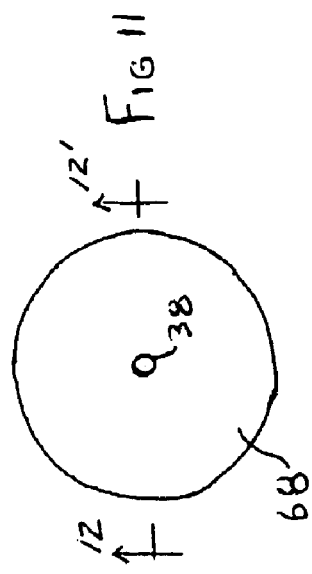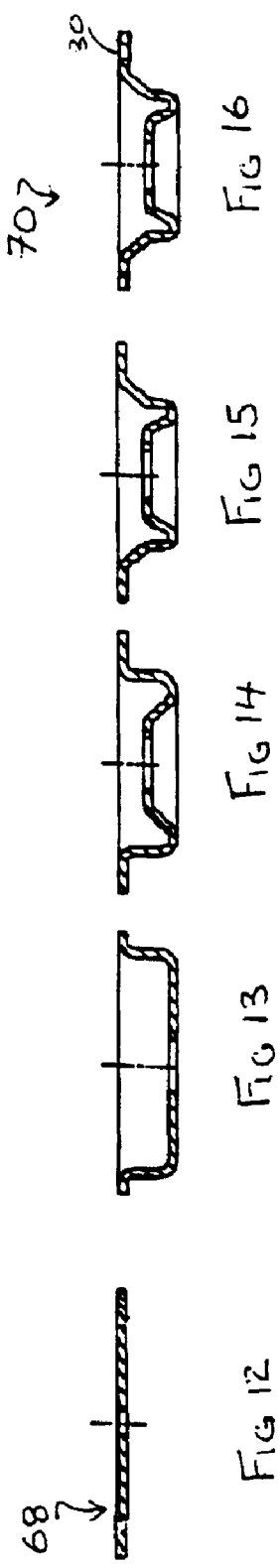

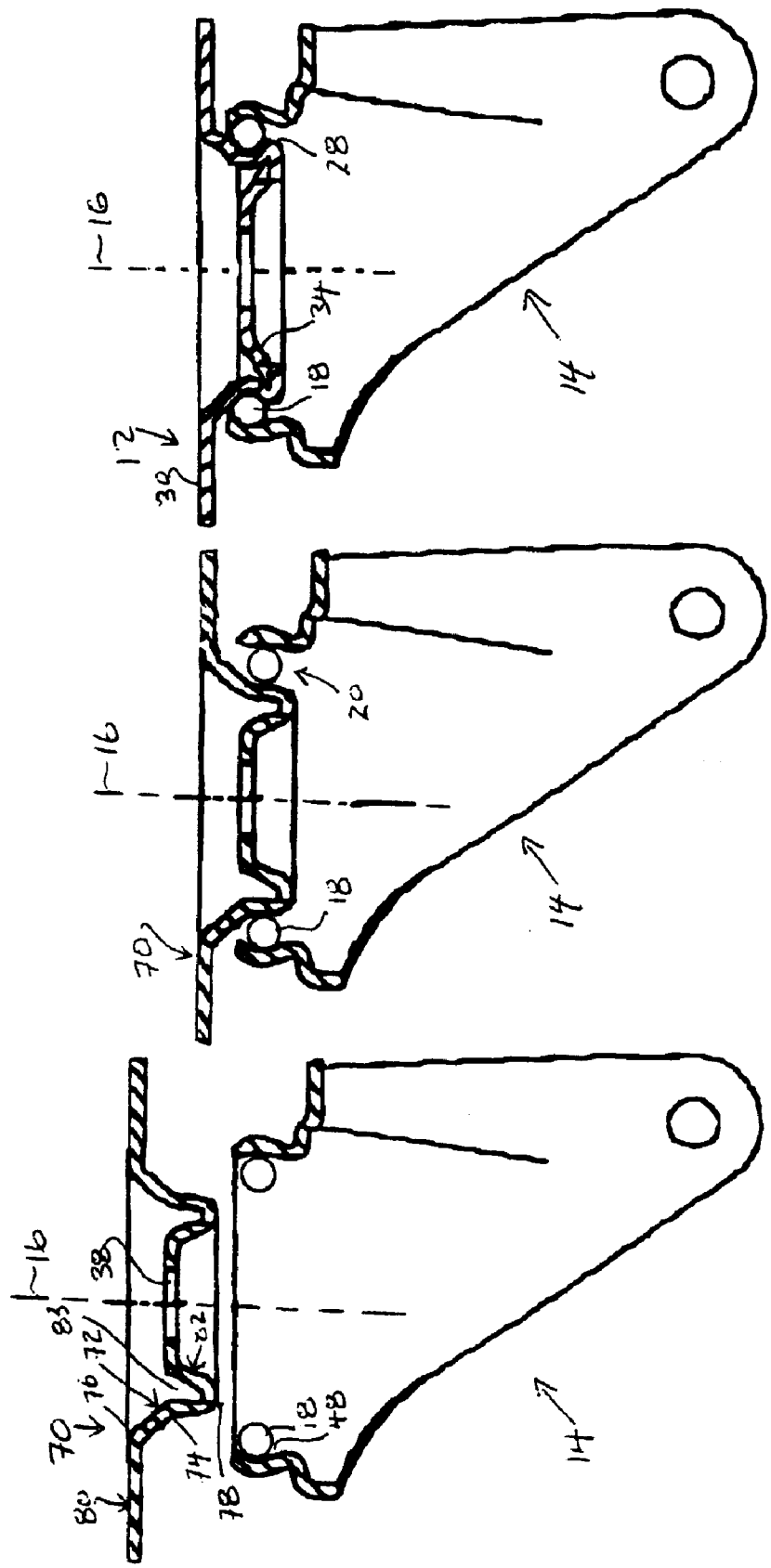

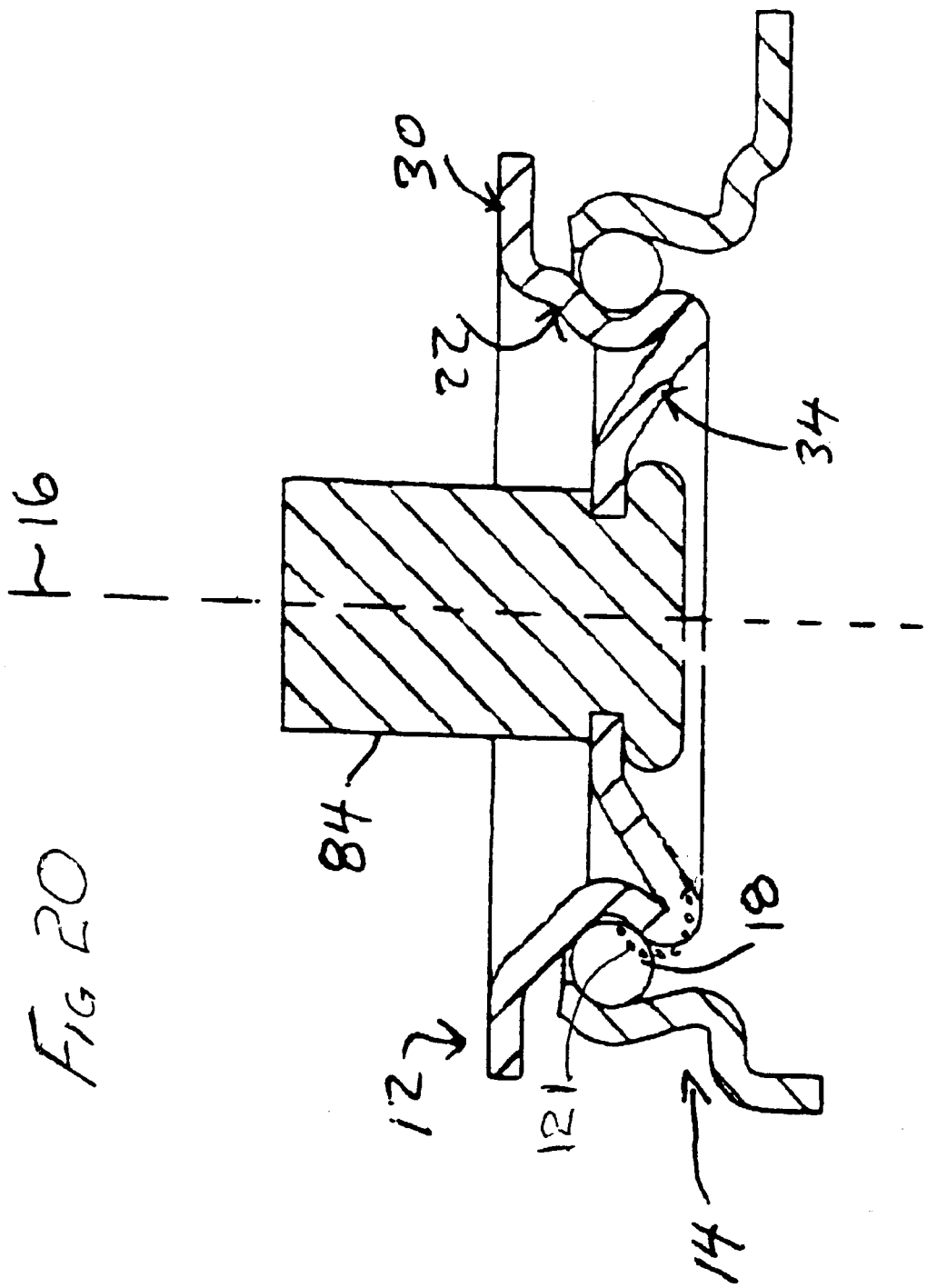

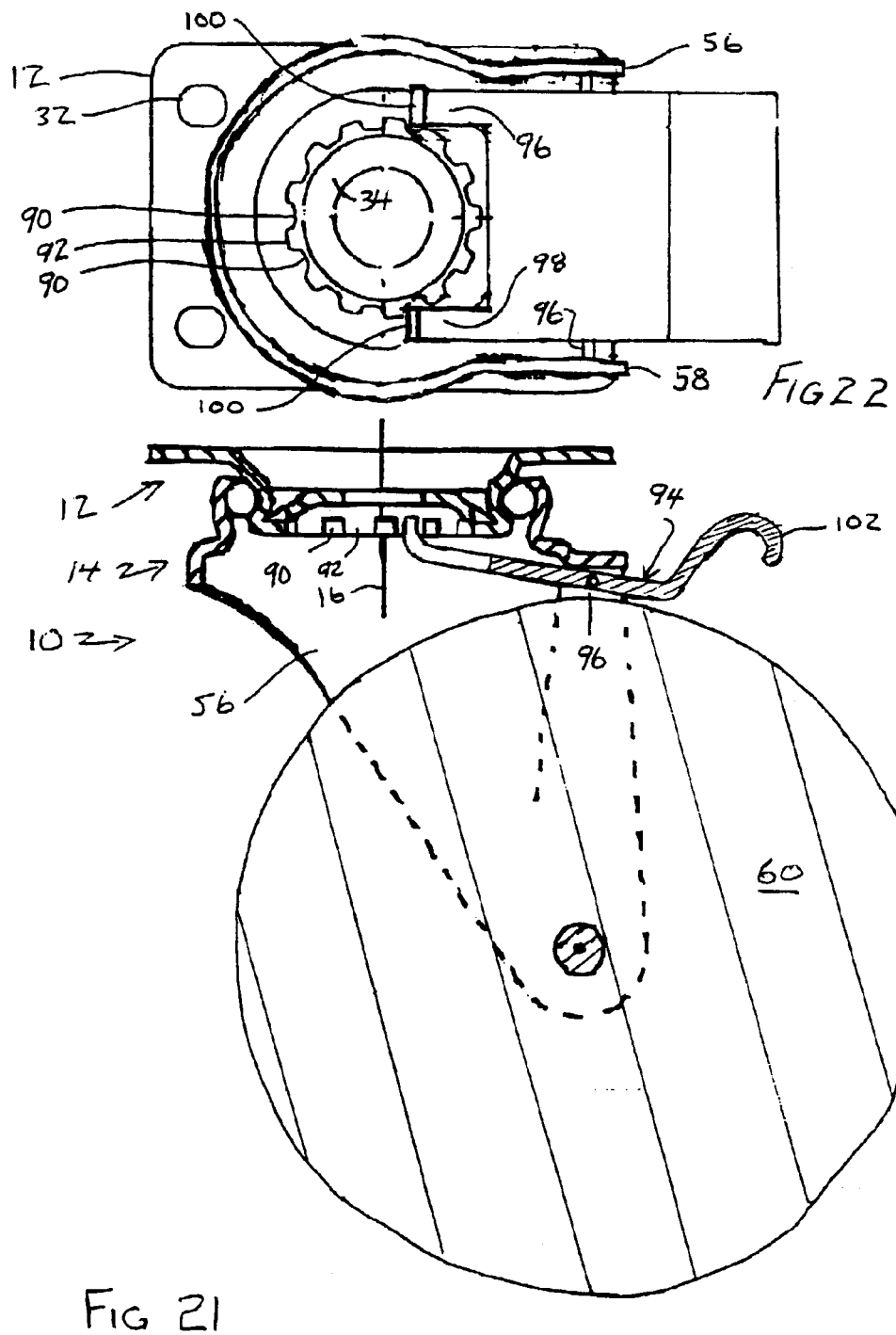

KINGPIN-FREE CASTER ASSEMBLY

SCOPE OF THE INVENTION

This invention relates to a caster assembly and, more particularly, to a caster assembly without a kingpin.

BACKGROUND OF THE INVENTION

Swivel casters are well known in which a yoke and a plate are held together by a kingpin so that the yoke and plate are coaxially disposed journalled to each other with a raceway of ball bearings therebetween for rotation about a swivel axis and with the kingpin coaxial with the swivel axis. The kingpin may be a rivet or threaded fastener or the like. Typically, a top washer and a bottom washer may be included to house the bearing. The yoke carries a wheel journalled thereto.

Such kingpin casters suffer the disadvantage that they are prone to failure by failure of the kingpin such that the yoke and plate become able to move axially apart and a sloppiness develops which increases wear. Failure of the kingpin can lead to catastrophic failure with complete separation of the yoke from the plate.

Kingpin casters also suffer the disadvantage that they comprise at least the kingpin, the yoke, the plate and ball bearings and that their manufacture involves handling and assembling of these components.

Kingpin casters suffer the disadvantage that the kingpin typically focuses axially directed forces necessary to hold the yoke and plate axially together radially closer to the swivel axis than the raceway holding the bearings and, thus, is at a disadvantage to resist moment-inducing loading forces tending to act on a wheel carried off center by the swivel axis as is typical in a caster.

Casters which do not have a kingpin are known in which the yoke and plate are made by machining and/or casting processes and in which ball bearings are inserted into a raceway through special access openings machined in the yoke and/or plate. Such kingpin-free caster assemblies have yokes and plates which are expensive to manufacture and to assemble.

SUMMARY OF THE INVENTION

To at least partially overcome these disadvantages of previously known devices, the present invention provides a kingpin-free caster in which a plate is assembled onto a yoke with ball bearings therebetween and one of the plate and yoke is deformed and strengthened in place upon the other of the yoke and plate to capture the ball bearings between the yoke and plate and couple the yoke and plate together against removal.

An object of the present invention is to provide a caster which can be manufactured at low cost.

Another object is to provide a caster which can be manufactured from a minimal of parts.

Another object is to provide a caster in which a plate and a yoke are coaxially disposed about a swivel axis with ball bearings therebetween and in which each of the plate and yoke are formed from a sheet of metal.

Another object is to provide a caster in which a plate and a yoke are coaxially disposed journalled for rotation about a swivel axis and in which the mechanism for journalling consists solely of the plate and yoke, a raceway formed therebetween and bearings in the raceway.

Another object is to provide a swivel lock caster and/or a wheel lock caster from a minimum of parts.

In one aspect, the present invention provides a caster comprising:

a formed sheet metal plate, a yoke, and a plurality of ball bearings, the plate and yoke each disposed about a swivel axis, an outer race on a first of the yoke and the plate as an axially extending annular flange portion defining a radially outer rolling periphery of a raceway, a second of the yoke and the plate having an annular axially extending race forming wall portion carrying a radially outwardly directed inner race thereon defining a radially inner rolling periphery of a raceway, the wall portion having a first annular perimeter on a first axial side of the race and a second annular perimeter on a second axial side of the race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the wall portion, the wall portion disposed coaxial to and radially within the outer race presenting the inner race opposed to the outer race forming the raceway therebetween with the ball bearings captured between the inner race and outer race against removal coupling the plate to the yoke against uncoupling but journalled for rotation of the plate relative the yoke about the swivel axis, the inner flange portion resisting deformation of the wall portion radially, the outer flange portion resisting deformation of the wall portion radially, the yoke having two spaced legs extending axially of the swivel axis on either side of the swivel axis away from the plate, a wheel mounted to the yoke between the legs for rotation about a wheel axis normal to the swivel axis.

Preferably, circumferentially spaced pockets are provided in one of the inner race and the outer race to retain ball bearings in the raceway against circumferential relative movement relative the one of the inner race and the outer race carrying the pockets.

The present invention provides a caster assembly in which a first of a plate and a yoke are finally formed to have a first race before assembly and preferably heat treated. The second of the plate and yoke is pre-formed and will effectively have a complementary second race, however, which is only partially formed and axially open to one axial end. The plate and yoke are assembled with ball bearings between the first race and second race and, after assembly, the second of the plate and yoke is deformed to a final form by closing its axially open second race capturing the ball bearings between the yoke and plate. In the preferred final form, the inner race has a reinforcing inner flange formed radially inwardly from what was previously the axially open race in a pre-formed condition and this reinforcing interior plate assists in reinforcement against failure.

BRIEF DESCRIPTION OF THE DRAWINGS

Further aspects and advantages of the present invention will appear from the following description taken together with the accompanying drawings in which:

FIG. 3 is an enlarged cross-section of the plate as seen in FIG. 2;

FIG. 4 is an enlarged cross-section of the yoke as seen in FIG. 2;

FIG. 5 shows a sheet metal blank for the yoke in FIG. 1;

FIG. 6 is a cross-section along section line 6–6' of the blank in FIG. 5;

FIGS. 7 to 10 show in cross-section similar to FIG. 6 but of successive configurations of the blank in the manufacture of the yoke for the caster of FIG. 1;

FIG. 11 shows a sheet metal blank for the plate;

FIG. 12 is a cross-section along section line 12–12' of the blank in FIG. 11;

FIGS. 13 to 16 show successive configurations of the blank in the manufacture of the plate for the caster of FIG. 1;

FIG. 17 shows the yoke of FIG. 10 and a pre-plate of FIG. 16 in an exploded cross-sectional view prior to assembly;

FIG. 18 schematically shows the assembly of the yoke of FIG. 10 with a pre-plate of FIG. 16 prior to final forming;

FIG. 19 shows in cross-section the yoke and pre-plate of FIG. 17 after final forming as the yoke and plate of the caster in accordance with FIG. 1;

FIG. 20 shows a cross-sectional view similar to that shown in FIG. 18 but of a caster stem in accordance with a second preferred embodiment of the invention;

FIG. 21 is a cross-sectional side view similar to that of FIG. 2 but of a swivel locking caster in accordance with a third embodiment of the invention in a locked configuration;

FIG. 22 is a bottom view of the caster of FIG. 21;

DETAILED DESCRIPTION OF THE DRAWINGS

Figure 1:
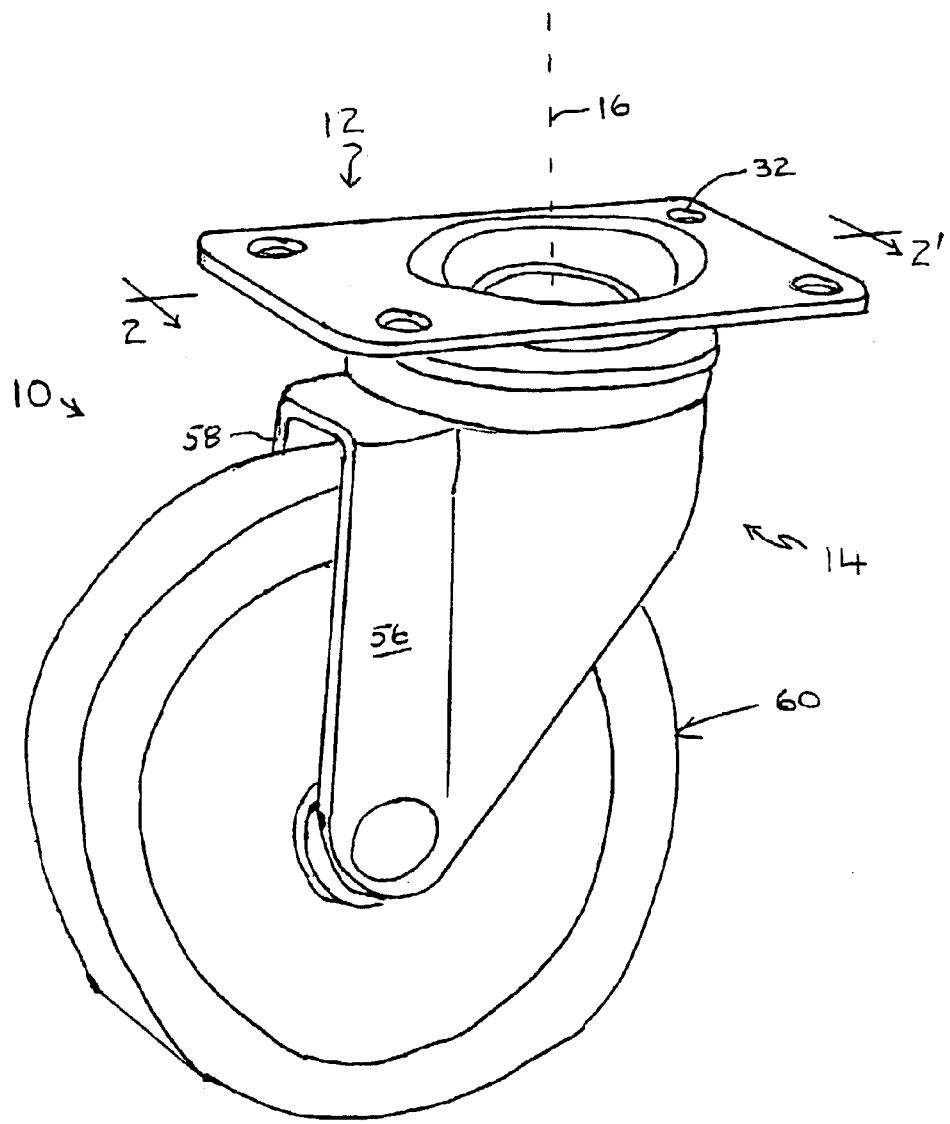
FIG. 1 is a pictorial view of a caster in accordance with a first preferred embodiment of the present invention.
Figure 2:
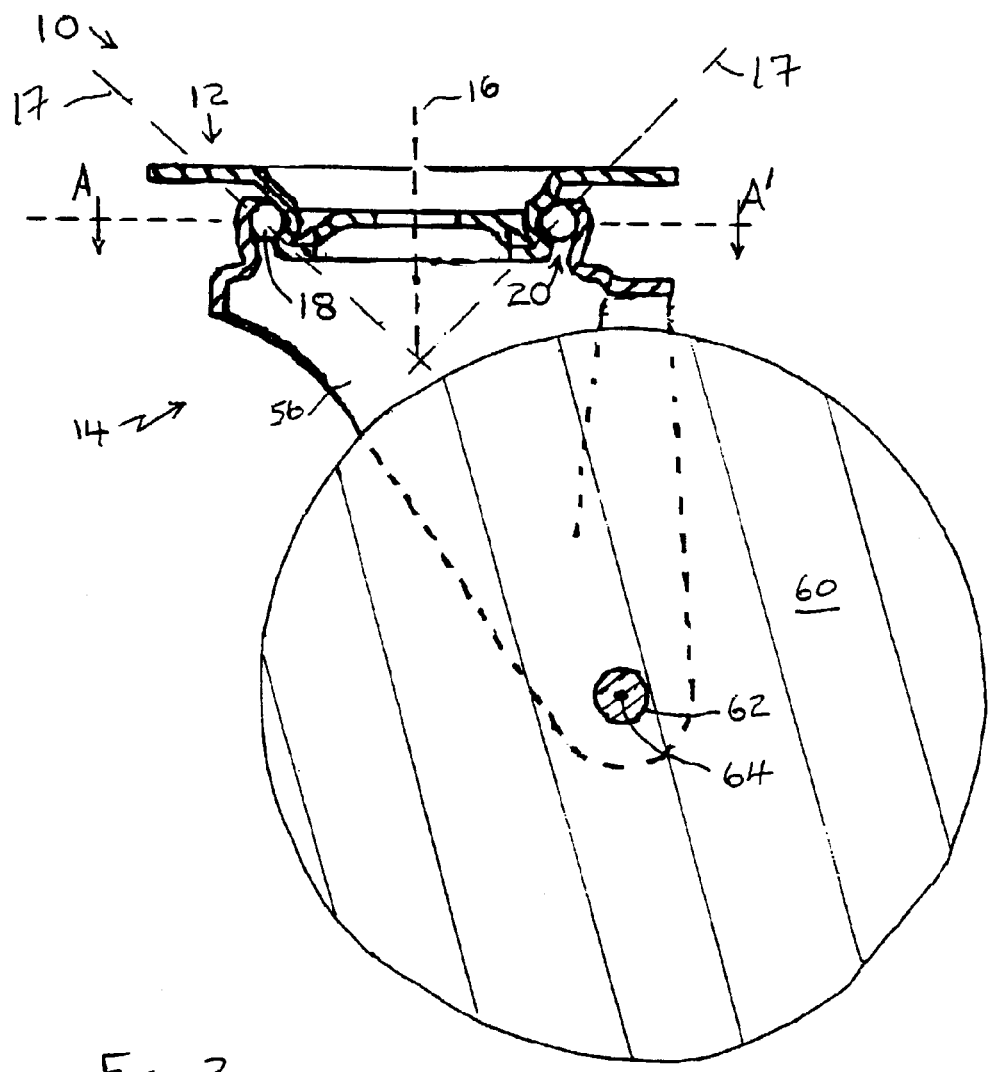
FIG. 2 is a cross-sectional side view of the caster of FIG. 1 along section line 2–2'.

Reference is made first to FIGS. 1 and 2 which show a caster 10 in accordance with a first embodiment of the present invention. The caster 10 comprises a plate 12 and a yoke 14 which are journalled for rotation relative to each other about a swivel axis 16 by means of a plurality of ball bearings 18 received in an annular raceway 20 formed between the plate 12 and the yoke 14.

As best seen in the enlarged cross-section of FIG. 3, the plate 12 comprises an annular axially extending race-forming wall portion 22 which carries a radially outward directed inner race 24 thereon defining a radially inner rolling periphery of the raceway 20. The wall portion 22 has a first annular perimeter 26 on a first axial side of the inner race 24 and a second annular perimeter 28 on a second axial side of the inner race 24 away from the first axial side. In FIGS. 2 and 3, the first axial side of the inner race 24 is the axial upper side of the inner race 24 and the second axial side is the axially lower side of the inner race 24.

The wall portion 22 merges at the first annular perimeter 26 into an annular reinforcing outer flange portion 30. The outer flange portion 30 extends radially outwardly from the wall portion 22 preferably as shown as a planar member disposed in a plane normal to the swivel axis 16. As seen in FIG. 1, the outer flange portion 30 preferably has a plurality of holes 32 therethrough as to receive fasteners such as bolts to extend upwardly through the holes 32 as to fasten the outer flange portion 30 to the undersurface of a vehicle, not shown, to which the caster is to be attached. The outer flange portion 30 preferably extends radially outwardly from the first annular perimeter 26 of the wall portion 22 radially beyond the outer race 48.

In the preferred embodiment, the first annular perimeter 26 of the wall portion 22 comprises a radially outermost portion of the wall portion 22 on the first axial side of the inner race 24 and a radially innermost portion of the outer flange portion 30.

The wall portion 22 merges at its second annular perimeter 28 into an annular reinforcing inner flange portion 34. The inner flange portion 34 extends radially inwardly from the second annular perimeter 28 of the wall portion 22. In the preferred embodiment shown, the inner flange portion 34 extends initially radially inwardly and axially towards the first axial side of the inner race 24 as a angled cone-like segment 35 and then radially towards the swivel axis 16 as a planar central disc segment 37 normal to the swivel axis 16 with a central circular aperture 38 disposed coaxially about the swivel axis 16. In this regard, the inner flange portion 34 is coaxial about the swivel axis 16 and forms a cup shaped annular disc or bowl member.

In the preferred embodiment, the second annular perimeter 28 of the wall portion 22 comprises a radially outermost portion of the wall portion 22 on the second side of the inner race 24 and a radially innermost portion of the inner flange portion 34.

The plate 12 has a first surface 40 and a second surface 42. A radially outwardly directed surface of the wall portion 22 which defines a radially inner rolling periphery of the inner race 24 is a portion of the second surface 42.

As seen in FIG. 3, the plate 12 is effectively folded at the second annular portion 28 such that the first surface 40 of the plate 12 of the wall portion 22 radially inwardly from the second annular perimeter 28 engages the first surface 40 of the inner flange portion 34 over an annular area 41 where, in effect, the wall portion 22 and inner flange portion 34 are in engagement pressed together as two layers.

As best seen in the enlarged cross-section of FIG. 4, the yoke 14 has an axially extending annular flange portion 46 carrying a radially inwardly directed outer race 48 thereon defining a radially outer rolling periphery of the raceway 20.

The flange portion 46 has a first annular perimeter 50 on a first axial side of the outer race, shown as the axial upper side in FIG. 4. The annular flange portion 46 has a second annular perimeter 52 on a second axial side of the outer race 48 away from the first axial side. The yoke is shown to effectively end at the first annular periphery 50 on the first side of the outer race 48. At the second annular periphery, the annular flange portion 46 merges into an annular shoulder-forming portion 54 which merges into two spaced legs 56 and 58 extending axially relative the swivel axis 16 on either side of the swivel axis away from the annular flange portion 46. A wheel 60 is mounted between the legs 56 and 58 for rotation on an axle 62 which extends between the legs. The wheel 60 is thus mounted to the yoke 14 between the legs for rotation about a wheel axis 64 coaxial with the axle 62 and normal to the swivel axis 16. As seen in FIGS. 1 and 2 with the swivel axis 16 vertical, the wheel axis 64 is disposed spaced radially to one side of the swivel axis 16.

As best seen in FIG. 2, the ball bearings 18 are captured in the raceway 20 between the inner race 24 and the outer race 48 against removal. In this regard, the inner race 24 extends radially inwardly on both the inner side and outer side of the inner race 24 and the outer race 48 extends outwardly on both the inner side and the outer side of the outer race 48 such that the ball bearings 18 are captured between the inner race 24 and the outer race 48 against removal. Similarly, as is to be appreciated, the ball bearings as received in the inner race 24 and outer race 48 couple the plate 12 and yoke 14 together for journaling about the swivel axis 16 and, as well, against uncoupling of the plate 12 and yoke 14 from their journalled coupled relation as shown.

FIGS. 5 to 10 illustrate sequential steps in the manufacture of the yoke from a flat sheet of metal illustrated in FIG. 5. FIG. 5 illustrates a top view of a yoke blank 66 consisting of a flat sheet of metal which has been blanked and pierced and is shown in cross-section in FIG. 6. FIG. 7 is a cross-sectional view showing the blank 66 of FIG. 6 after having been formed to have the two leg members extend parallel to each other, however, in the cross-section shown, only one of which leg 56 is seen. FIG. 8 illustrates a cross-sectional view after piercing the element shown in FIG. 7 to enlarge the central opening 68. FIG. 9 illustrates a configuration that is developed from the element of FIG. 8 by drawing the opening 68 so as to provide an upstanding cylindrical collar 69. FIG. 10 shows a final form of the yoke 14, being the same as the form shown in FIGS. 2 and 4, with its annular flange portion 46, outer race 48 and shoulder-forming portion 54.

After forming the yoke 14 to its final form such as shown in FIG. 10, the yoke is ready for use in assembly. While not necessary, the yoke may preferably be heat-treated so as to increase the resistance of the yoke to deformation. If heat treatment is to be carried out, it should be carried out after forming the yoke and before assembling the yoke, plate and ball bearings.

Reference is made to FIGS. 11 to 16 which illustrate successive steps in the manufacture of a pre-plate element 70 from a flat sheet of metal illustrated in FIG. 11. FIG. 11 illustrates a top view of a plate blank 68 consisting of a flat sheet of metal which has been blanked and pierced and is shown in cross-section in FIG. 12. The plate blank 68 has a central opening 38.

FIG. 13 shows an element having a general U or cup shape as developed from the blank 68 of FIG. 8 by a first drawing step. FIG. 14 shows an element having a W or double cup shape as developed from the element of FIG. 13 by a second drawing step. FIG. 15 shows an element as developed from the element of FIG. 14 by a forming process. FIG. 16 shows a pre-plate member 70 formed from the element of FIG. 15 by blanking and piercing so as to cut excess material from the edges of an outer pre-flange and to provide holes such as holes 32 provided in the outer flange portion 30 but not shown in FIG. 16.

Reference is made to FIG. 17 which schematically illustrates the pre-plate member 70 of FIG. 16 and yoke 14 of FIG. 10 coaxially aligned on axis 16 but axially separated ready for assembly. FIG. 17 shows the ball bearings 18 as received in engagement in the outer race 48 of the yoke 14 and it is to be appreciated that the ball bearings 18 would not remain in this position unless held. The pre-plate member 70 is ready to be assembled onto the yoke 14 by relative axial movement.

As shown in FIG. 17, the pre-plate member 70 has an annular axially extending pre-wall portion 72 carrying a radially outwardly directed annular ring surface 74 thereon. The pre-wall portion 72 has a first annular perimeter 76 on a first axial side of the ring surface 74 and a second annular perimeter 78 on a second axial side of the ring surface 74 away from the first axial side. The pre-wall portion 72 merges at its first annular perimeter 76 into an outer pre-flange 80 extending radially outwardly from the pre-wall portion.

The pre-wall portion 72 merges at its second annular perimeter 78 into an annular reinforcing inner pre-flange portion 82 which extends radially inwardly from the pre-wall portion 72 then axially towards the first axial side of the ring surface and then radially as a central disc about an aperture 38. As seen, the pre-flange portion 82 is spaced inwardly from the pre-wall portion 72 with an annular gap 83 therebetween.

Both the pre-wall portion 72 on the second side of the ring surface 74 and the inner pre-flange portion 82 do not extend radially beyond a radially inwardly-most surface of the ball bearings 18 when received in rolling engagement in the outer race 48 of the yoke 14. This relationship permits inner pre-flange portion 82 and the pre-wall portion 72 on the second side of its first annular perimeter 76 to be insertable axially into the annular flange portion 46 of the yoke 14 with ball bearings 18 disposed in the outer race 48.

From the position of the pre-plate member 70 in FIG. 17, the pre-plate member 70 is moved axially relative the yoke 14 and ball bearings 18 to assume an assembled position as shown in FIG. 18.

From the assembled condition illustrated in FIG. 18, and having the pre-plate member 70, the yoke 16 and the ball bearings 18 maintained in the position of FIG. 18, forces are applied to the pre-plate member 70 to form and crimp the pre-plate member 70 so as to assume the configuration of the plate 12. The deformation of the pre-plate member 70 increases the radial outward extent of both the pre-wall portion 72 on the second side of the first annular perimeter 76 and the radial outward extent of the inner pre-flange portion 82. Forces are applied to the pre-plate member 70 in a manner to suitably deform the pre-plate member 70 without applying any substantial forces to the yoke 14 which would deform the yoke 14. The deformation of the radial outward extent of the pre-wall portion on the second side of the ring surface 74 and of the inner pre-flange portion thereby forms the inner race 24 and in so doing captures the ball bearings 18 between the outer race 48 and the inner race 24.

Figure 24:
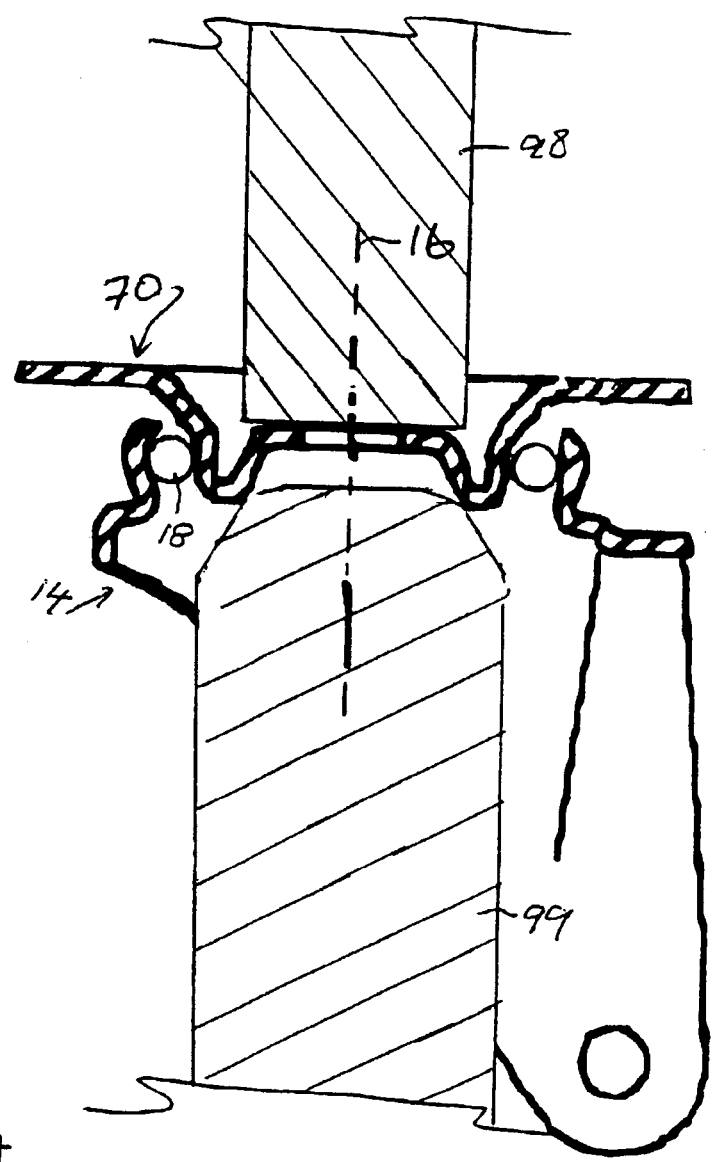
FIG. 24 shows a die arrangement used to deform the assembly of FIG. 17 into the final form as shown in FIG. 16.

FIG. 24 illustrates the yoke 14, ball bearings 18 and pre-plate member 70 held in the position of FIG. 18 and acted upon by two forming dies 98 and 99 to form the pre-plate member 70 to assume the shape of the plate 12.

In the preferred embodiment disclosed, in the pre-plate member 70, the outer pre-flange portion 80 of the pre-plate member 70 is preferably identical to the outer flange portion 30 of the plate member and therefore the deformation of the pre-plate member is without deforming the outer pre-flange portion 80.

In a final form of the plate 12 as seen in FIGS. 2 and 19, it is to be appreciated that the inner flange portion 34 resists deformation of the wall portion 22 particularly by reason of the overlapping of the wall portion and flange portion thus providing double thickness of the sheet material radially inwardly from the second annular perimeter 28 preferably as shown in the preferred embodiment with some of the overlapping portions including an annular area where the two layers not only overlap but also engage each other. So as to provide resistance to deformation, the inner flange portion 34 preferably extends radially inwardly from the second perimeter 28 of the wall portion 22 further radially inwardly of the inner race 24. More preferably, the inner flange portion 34 extends radially inwardly from the second annular perimeter 28 of the wall portion 22 at least one half the distance to the swivel axis 16.

The outer flange portion 30 also assists in resisting deformation of the wall portion. The plate 12, therefore, although it is formed from a sheet of metal, by reason of its particular configuration and particularly by reason of the annular flange portion extending radially inwardly from the inner race 24 provides significantly increased strength to the inner race 24 against deformation.

Reference is made to FIG. 20 which shows a caster 10 in accordance with a second embodiment which differs from the caster of the first embodiment only in that a stem 84 is provided secured to the plate 12 against rotation. The stem 84 is preferably a cylindrical member coaxially disposed to the swivel axis 16 and secured in the central opening of the inner flange portion 34. A radially inner edge of the inner flange portion 34 is shown received in a press-fit inside an annular channel in the stem 84 as with the stem 84 being applied in a rivet-like manner. The stem 84 may be used to secure the caster 10 to an article, either alone or in combination with the outer flange portion 30. The stem 84 is preferably applied after the plate 12 has been assembled and formed onto the yoke, however, could be applied to the pre-plate member before or after assembly onto the yoke.

Figure 23:
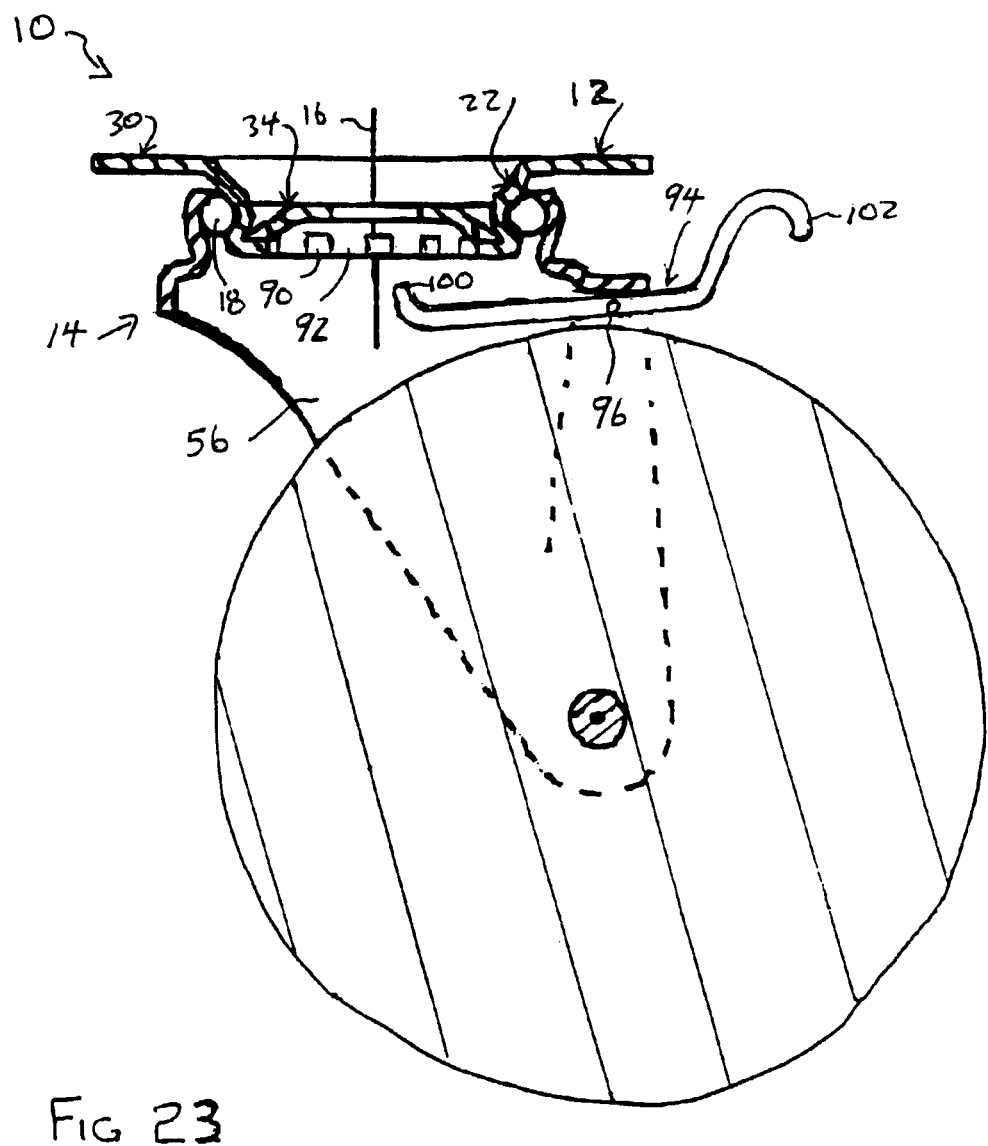
FIG. 23 is a cross-sectional side view similar to that of FIG. 21 but with the caster in an unlocked configuration.

Reference is made to FIGS. 21 to 23 which show as a third embodiment of the present invention a caster 10 identical to the caster of the first embodiment but with a lock mechanism which can be activated to lock the yoke 14 against swivelling relative the plate 12 about the swivel axis 16. The caster in FIGS. 21 to 23 is identical to the caster in FIGS. 1 and 2 but for two features. A first feature is the modification of the plate 12 so as to provide the radially inwardly directed surface of the inner flange portion 34 with gear-like teeth 90 and recesses 92 therebetween. A second feature is the inclusion of a locking lever 94 mounted to the yoke 14 via a pin 46 extending between the legs such that the lever 94 may be pivoted between a locking configuration as seen in FIG. 21 and an unlocked configuration as seen in FIG. 23. The lever 94 is elongate and has a bifurcated inner end carrying two arms 96 and 98 each of which has an inner catch end 100 adapted to become engaged in recess 92 between the teeth 90 on the plate 12 and lock the yoke 14 to the plate 12 against relative swivelling about the axis 16 when in a locking configuration as seen in FIG. 21. The lever 94 has a second, outer end 102 which is accessible so that a user may move the lever between the locking configuration of FIG. 21 and the unlocked configuration of FIG. 23. As seen in FIG. 23, the lever 94 has been pivoted about pin 96 such that its catch ends are disengaged from the plate 12 and the plate 12 is free to pivot relative the yoke 14 about the swivel axis 16. The lever 94 is shown as one simplified version of a locking mechanism to engage the plate 14. Many other mechanisms may be provided. As well, various mechanisms may be provided to bias the lever 94 so that it will assume and maintain either the configuration of FIG. 21 or that of FIG. 23 until moved by a user to the other configuration. The swivel lock mechanism may also be used in conjunction with a mechanism to lock the wheel against rotation on its wheel axis.

The teeth 90 and recesses 92 on the plate 12 may be formed in a final step of forming the pre-plate 70 into the yoke 14.

Figure 25:
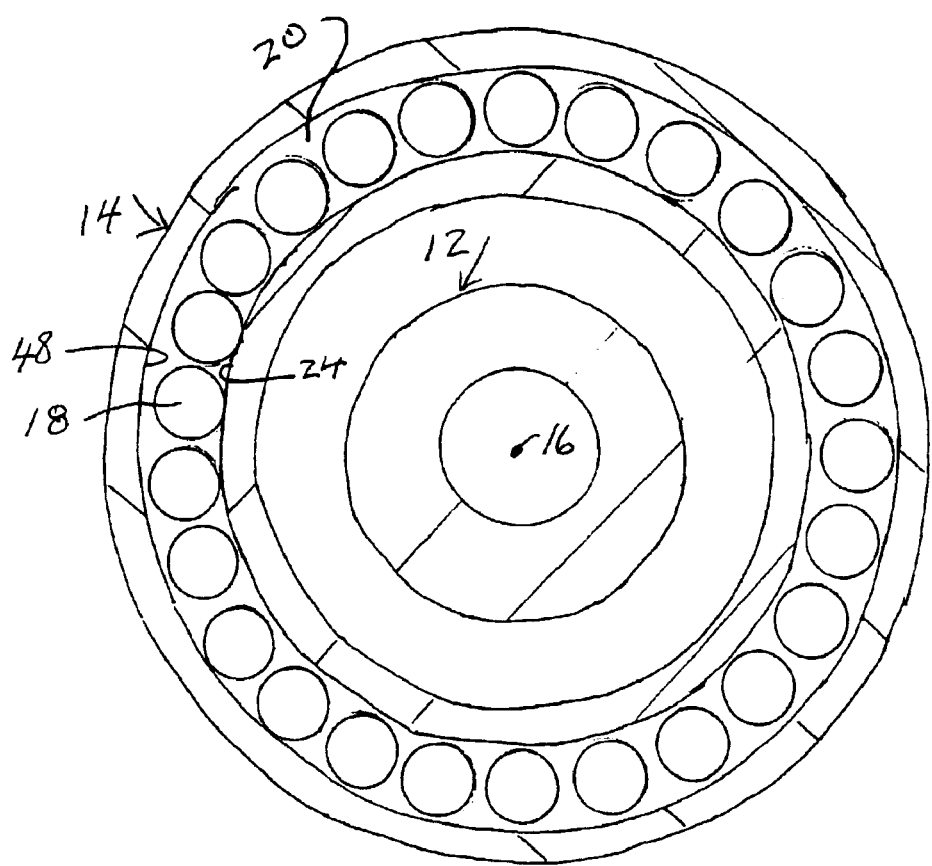
FIG. 25 is a cross-sectional view along section line A–A' in FIG. 2.

Reference is made to FIG. 25 which is a cross-sectional view along section line A–A' in FIG. 2. FIG. 25 shows that a plurality of ball bearings 18 are captured in the raceway 20 between the inner race 24 and the outer race 48, with the ball bearings 18 substantially filling the entire circumferential extent of the raceway 20. Each ball bearing is free to engage adjacent ball bearings and, as well, each of the inner race 24 and the outer race 48.

Figure 26:
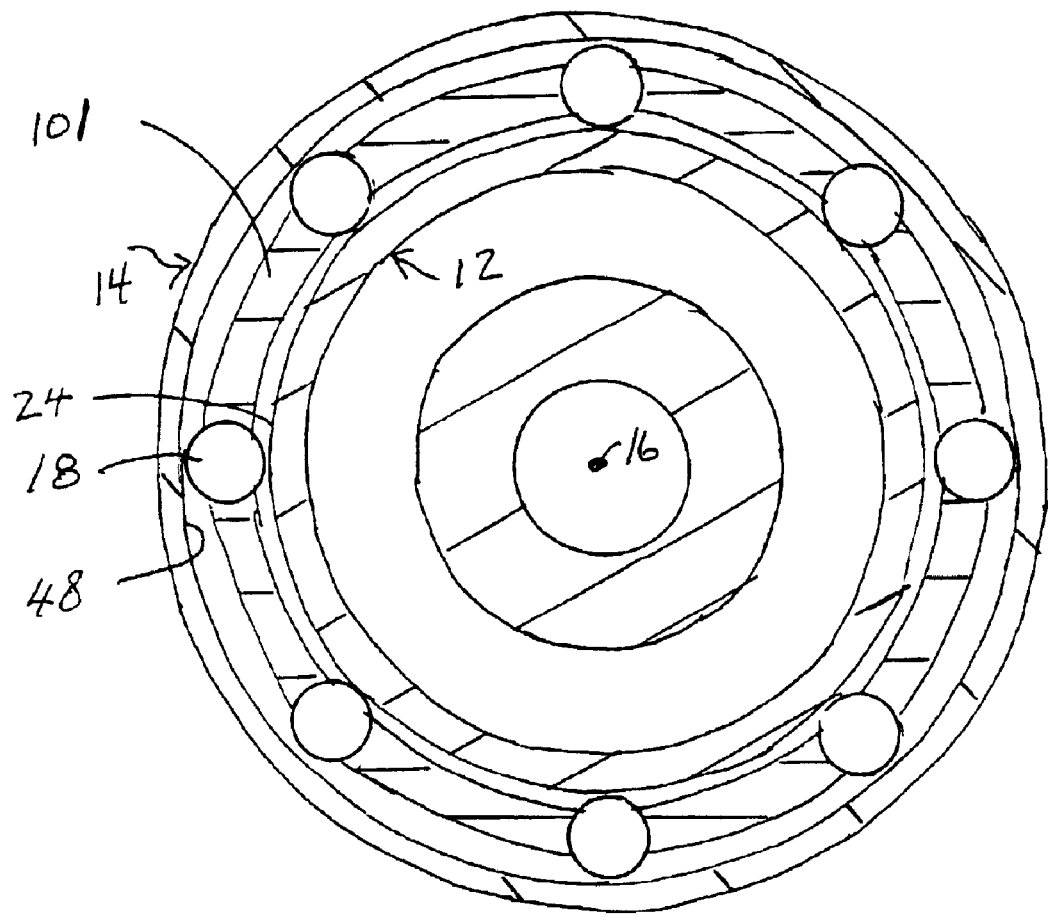
FIG. 26 is a cross-sectional view the same as that in FIG. 25, however, of an embodiment utilizing a bearing cage to contain the ball bearings.

FIG. 26 illustrates a view similar to that in FIG. 25, however, in which eight ball bearings 20 are held in a cage 101 which locates each ball bearing 18 at a circumferentially spaced location relative adjacent ball bearings 18. Of course, a greater or lesser number of ball bearings may be provided. Such bearing cages 101 are well known and may comprise one or two pieces preferably of plastic as, for example, taught by U.S. Pat. No. 3,157,443 to Draudt and U.S. Pat. No. 4,133,588 to Earsley. In FIG. 26, as in FIG. 25, the inside surfaces of both the inner race 24 and the outer race 48 are circular in cross-section.

Figure 27:
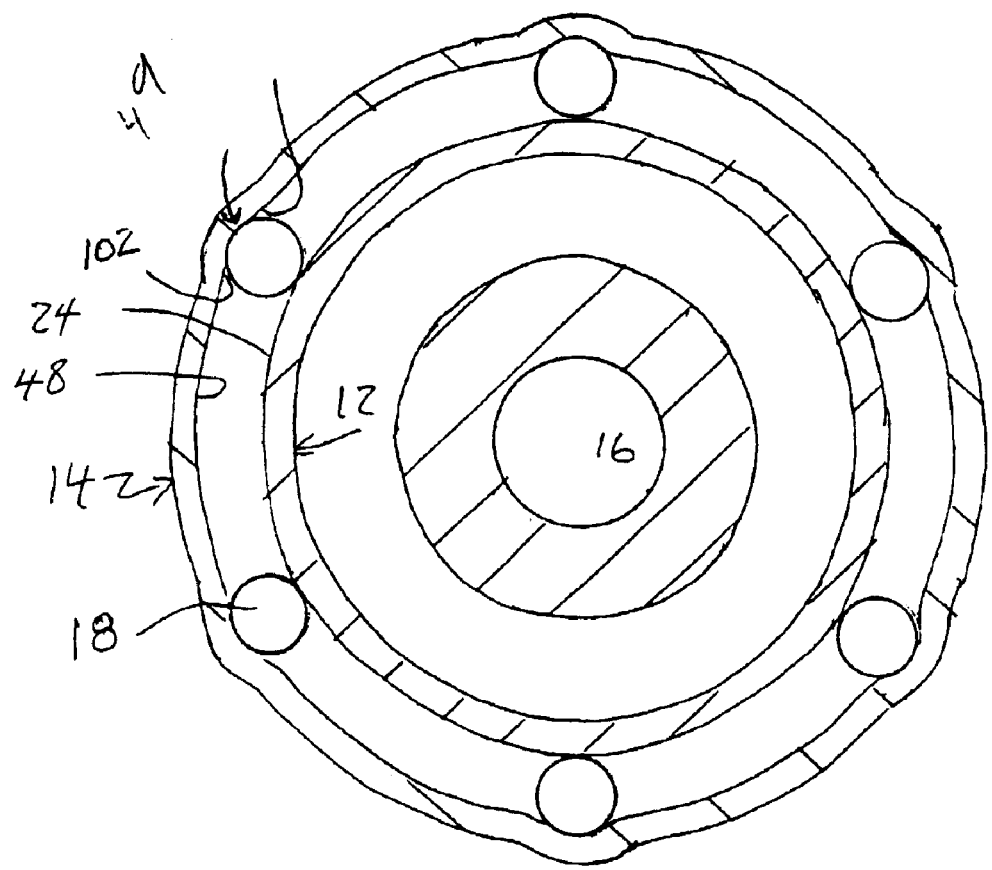
FIG. 27 is a cross-sectional view similar to that in FIG. 25 but in an embodiment in which the ball bearings are held circumferentially spaced by pocket deformations formed in the yoke 14.

Reference is made to FIG. 27 which shows a cross-sectional view similar to FIG. 25, however, in a preferred embodiment in which the yoke 14 has been provided with a mechanism for keeping the ball bearing in circumferentially spaced locations as in a manner previously accomplished with the cage 102 in FIG. 26 but without the need for a separate cage element. As seen in FIG. 27, the outer race 48 of the yoke 14 is formed so as to define a pocket 49 therein to receive each ball bearing 18 and constrain the ball bearing 18 against circumferential movement relative to the yoke 14. In this regard, each of the pockets 49 provides two shoulder surfaces 102 and 104 on either side of a ball bearing 18. The ball bearing 18 as engaged between the outer race 48 of the yoke 14 and the inner race 24 of the plate 12 and between the shoulder surfaces 102 and 104 becomes constrained against circumferential movement relative to the yoke 14 yet free to roll on the inner race 24 which is circular in cross-section about the axis 16. The pockets 49 may preferably be formed in the outer race 48 of the yoke 17 in forming the yoke into its final form and, if heat treating is optionally to be carried out, before heat treating. Deformation of the yoke 14 to provide the pockets 49 is advantageous in that it increases the strength of the yoke 14 against deformation even though the pockets need have a maximum radial extent of relatively small dimensions, say, possibly in the range of about 10,000 to 15,000ths of an inch, for example.

Figure 31:
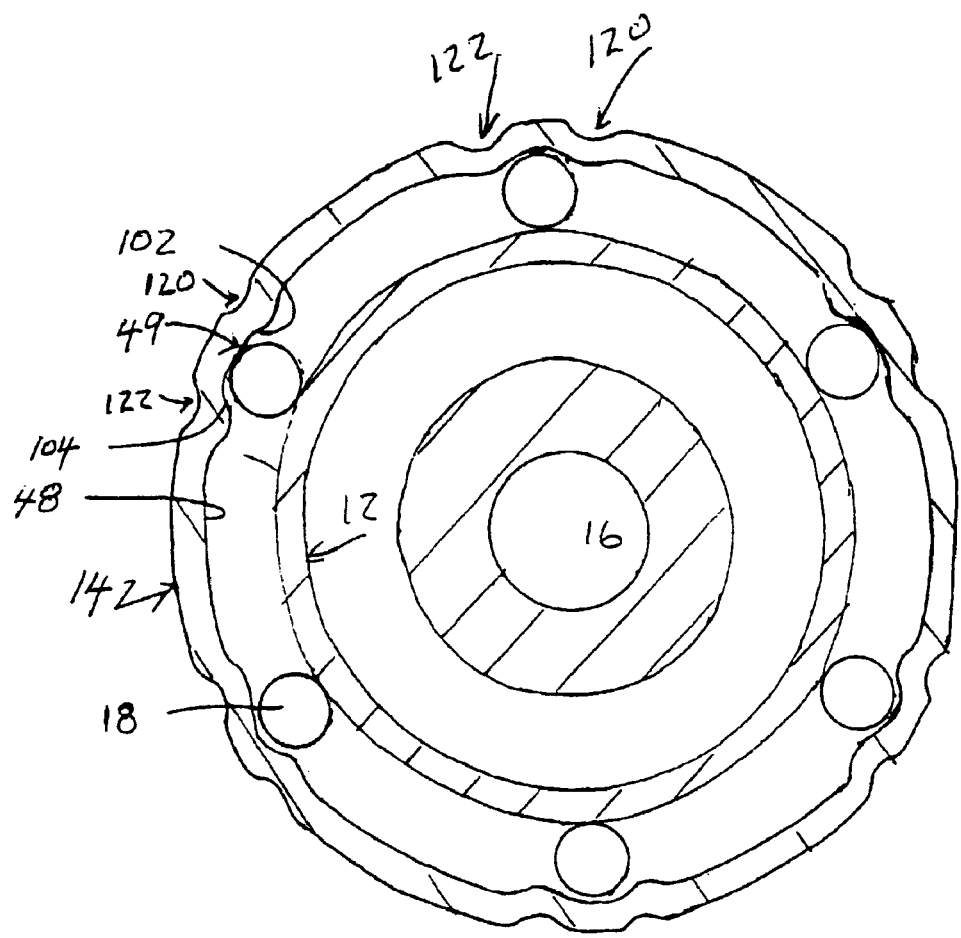
FIG. 31 is a cross-sectional view similar to that in FIG. 27 but of a slightly different embodiment.

Reference is made to FIG. 31 which shows a cross-sectional view similar to FIG. 27 in that the outer race 48 of the yoke 14 is formed so as to define a pocket 49 therein to receive each ball bearing 18 and constrain the ball bearing 18 adjacent circumferential movement relative the yoke 14. As in FIG. 27, each pocket provides two shoulder surfaces 102 and 104 on either side of a ball bearing 18. FIG. 31 differs from FIG. 27 merely in the manner by which the pockets have been formed. In FIG. 31, two crimp indentations 120 and 122 are provided on either side of a pocket 49 to define the pocket therebetween, and the outer race 48 otherwise than at the crimp indentations 120 generally has a constant radius adapted to engage the ball bearings 18. Of course, many different forming operations and configurations may be adopted to provide suitable pockets 49 as by axial and/or radial crimping or forming of the yoke 14 and its outer race. Reference is made to FIG. 20 which illustrates on the left-hand side a dotted line which shows an indentation 121 of the inner flange portion 34 on one side of a ball 18 formed by deforming the inner flange portion 34 axially, that is, parallel to the axis 16 so as to provide the indentation 121 which prevents a ball 18 from moving circumferentially therepast. Of course, two such indentations could be provided, one on either side of each ball bearing 18. The indentation 121 illustrated merely on the left-hand side of the inner flange portion 34 could be provided at circumferentially spaced locations to locate the balls 18 by forming pockets between the indentations. The indentations as illustrated in FIG. 20 could be considered, in one sense, to be formed by deforming the inner flange member under axially directed forces, that is, applied axially parallel to the axis 16 and, in this sense, to axial deform the inner flange portion 34. It is to be appreciated, however, that by such deformation, portions of the inner flange portion 34 could be seen to assume positions in which they also have been moved radially outwardly relative the axis 16. In the preferred embodiment, the formation of the indentation 121 as shown by the dotted lines on the left-hand side of FIG. 20 may be formed in a final forming operation.

Figure 28:
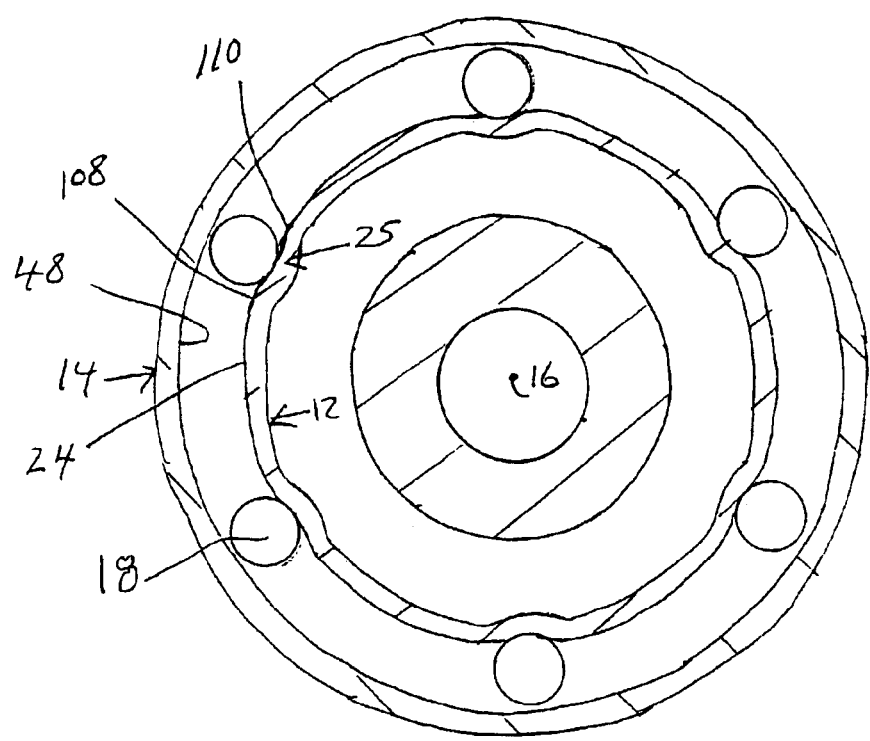
FIG. 28 is a cross-sectional view similar to that of FIG. 25 but of an embodiment in which the ball bearings are held circumferentially spaced by deformation pockets in the plate 12.

Use of separated ball bearings 18 as seen in FIGS. 26, 27 and 28 is advantageous to avoid friction and wear between adjacent balls and provides reduced overall friction, higher bearing capacity, ease of swivelling, increased durability, longer life and prevents catastrophic failure such as the complete separation of the yoke from the plate.

Reference is made to FIG. 28 which shows an arrangement substantially the same as that shown in FIG. 27, however, in which the ball bearings 18 are constrained against circumferential movement relative to the inner race 24 of the plate 12 by reason of pockets 25 being defined between shoulders 108 and 110 on either side of a ball bearing 18. The outer race 48 is shown as being circular in cross-section about the axis 16. The pockets 25 may preferably be formed in a final deformation of the pre-plate member 70 from an assembled condition shown in FIG. 24 to a final deformed condition of the plate 12 as seen in FIG. 2. Each of the pockets 25 with the shoulder surfaces 108 and 110 on either side of a ball bearing retain a ball bearing against circumferential movement relative to the plate 12.

In respect of the embodiments shown in FIG. 27 and FIG. 28, pockets may be formed either by radially and/or axial outward deformation of the member forming the race 48 or 24 or by radially and/or axial inward deformation of the same or by both radially and/or axial inward and radially and/or axial outward deformation. In that the deformation of either the inner race or outer race to provide the pockets can provide additional strength, the pockets may be provided in either the inner race or the outer race dependent upon which of the yoke or plate may be desired to be strengthened.

In the embodiment illustrated, for example, in FIG. 2 and FIG. 24, the yoke 14 is formed into a final state and, preferably, hardened by heat treating before assembly. The plate 12 is provided in the form of a pre-plate 70 which is deformed as by a step illustrated in FIG. 24 so as to provide a resultant product as shown in FIG. 2.

Figure 29:
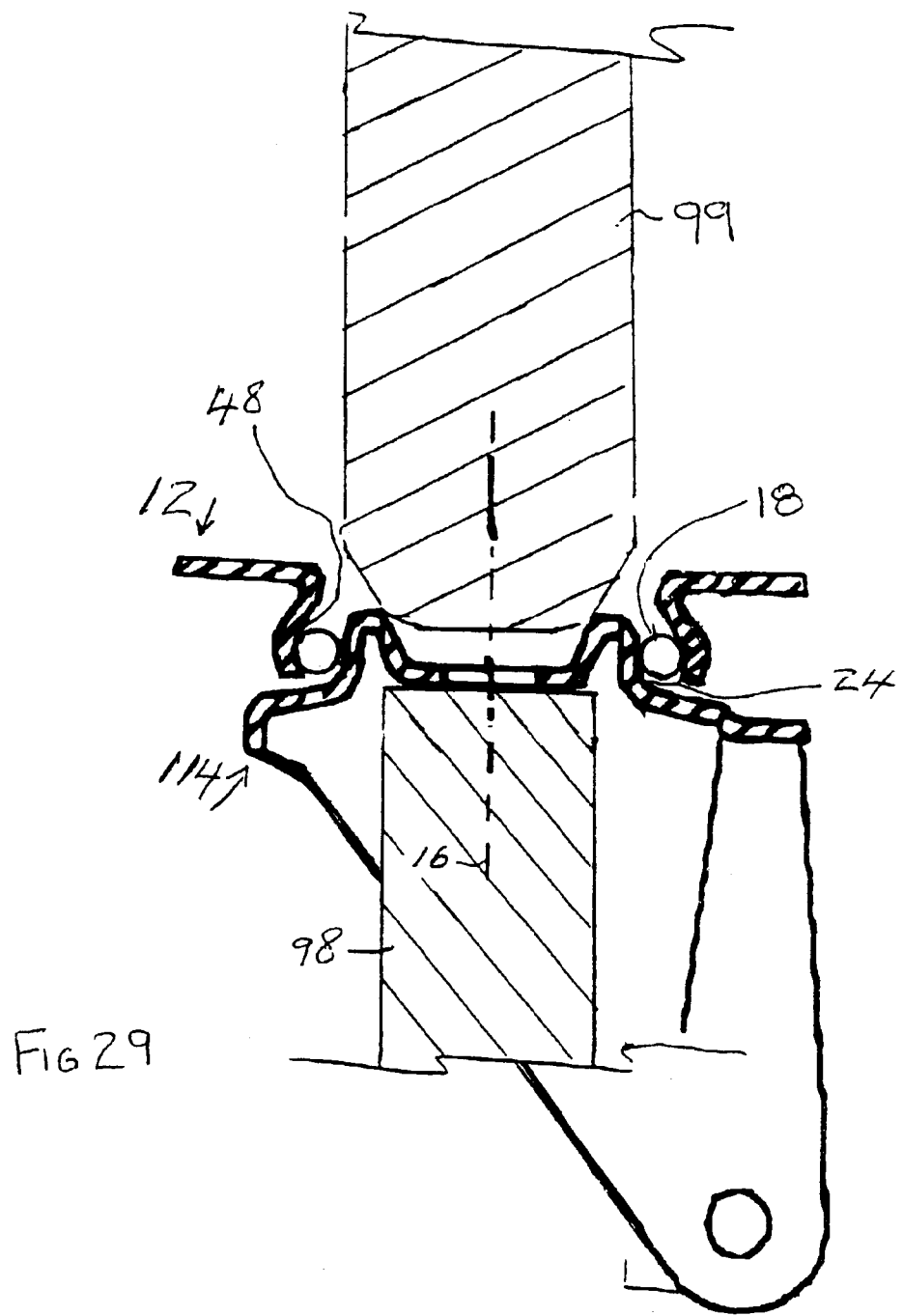
FIG. 29 shows a die arrangement used to deform an assembly similar to that in FIG. 21, however, with the pre-form comprising a pre-formed yoke.
Figure 30:
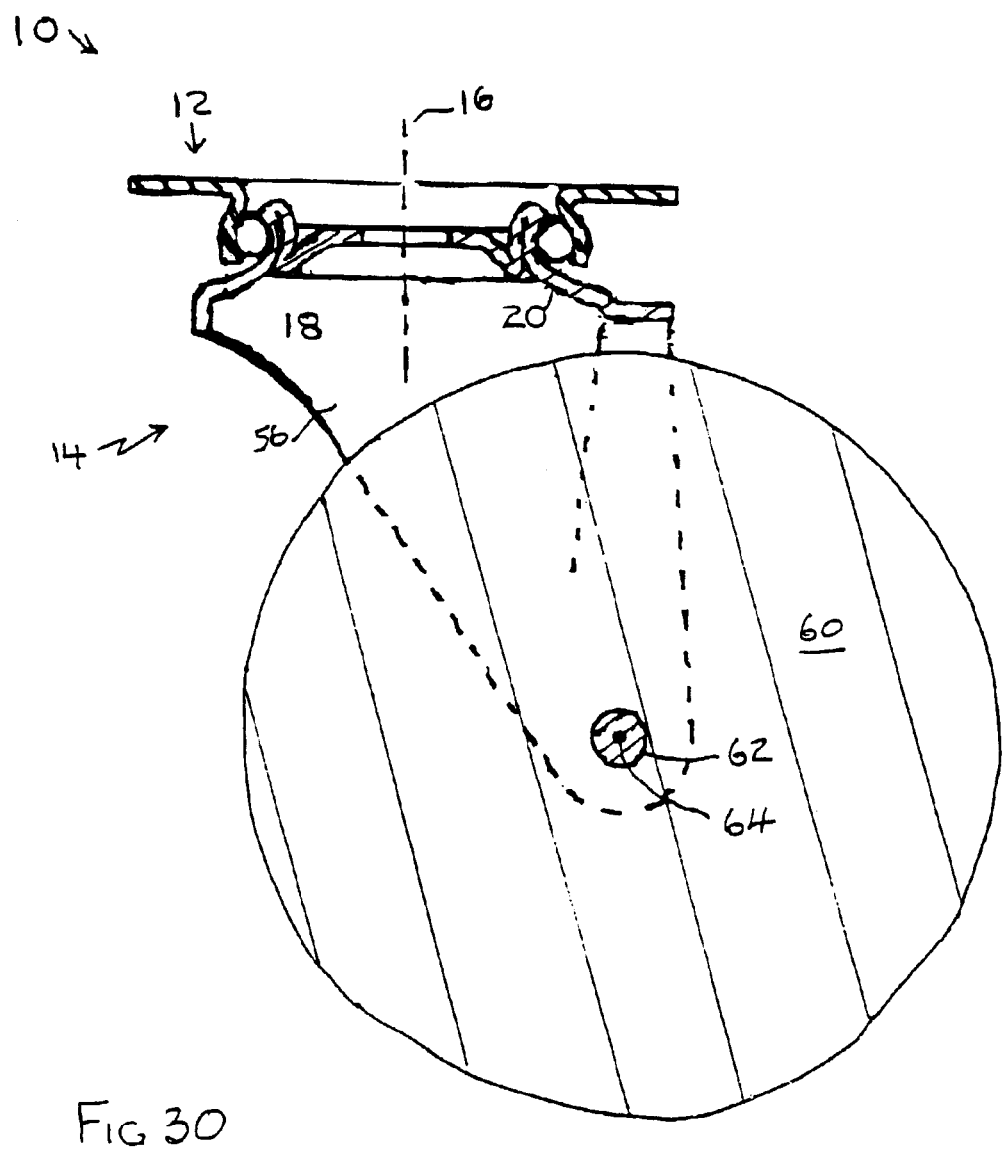
FIG. 30 is a cross-sectional side view of a caster similar to that in FIG. 2, however, as formed from the finally formed ring and pre-formed yoke as shown in FIG. 29.

Reference is made to FIGS. 29 and 30 which illustrate a different embodiment in which the plate 12 is provided in its final form and optionally, while not necessary, preferably, heat hardened prior to assembly. The plate 12 carries the outer race 48. The yoke is provided as a pre-yoke member 114 which carries the inner race 24. FIG. 29 illustrates the pre-yoke 114, ball bearings 18 and plate member 14 held in an assembled position and acted upon by two forming dies 98 and 99 to form the pre-yoke member 114 to assume the shape of the desired yoke 14 shown in FIG. 30. In FIG. 29, the plate 12 is preferably identical to the final form of the plate as shown in FIG. 30. Preferably, the deformation of the pre-yoke member 114 is without deforming the plate member 12 as seen in FIG. 29. It is to be appreciated that in deforming the pre-yoke member 114 in FIG. 29 that similar concerns arise as discussed with the embodiment illustrated in FIGS. 2 and 24.

The embodiment illustrated in FIGS. 29 and 30 can, in certain circumstances, be advantageous. Typically, the plate 12 is of relatively simple construction and can be advantageously selected to have either a greater strength or to be formed from greater material. Preferably, insofar as the outer race 48 may carry pockets 49 for ball bearings as discussed in association with FIG. 27, then this may further aid strengthening of the plate 12.

Reference is again made to FIG. 11 which for ease of illustration illustrates a circular blank. It is to be appreciated, however, that the blank member 68 need not be circular and may have many other shapes as, for example, rectangular, square or otherwise.

Referring to FIG. 2, two dashed lines 17 are disposed at 45 degrees to the axis 16 and are illustrated, as where the lines 17 intersect each of the ball bearings 18, for the preferred location for contact between the ball bearing 18 and either the inner race 24 of the ring 12 or the outer race 48 of the yoke 14. In accordance with the present invention, the final form of the raceway as illustrated in FIG. 2 preferably provides for such contact approximately where the line 14 joins the ball bearing to the respective inner race 24 or outer race 48.

The invention has been defined with reference to the preferred embodiment. Many modifications and variations will now occur to persons skilled in the art. For a definition of the invention, reference is made to the following claims.

We claim:

1. A caster comprising:
    a formed sheet metal plate, a yoke, and a plurality of ball bearings,
    the plate and yoke each disposed about a swivel axis,
    the plate having an axially extending annular wall portion carrying a radially outwardly directed inner race defining a radially inner rolling periphery of a raceway,
    the yoke having an annular axially extending race forming flange portion carrying a radially inwardly directed outer race thereon defining a radially outer rolling periphery of the raceway,
    the wall portion having a first annular perimeter on a first axial side of the inner race and a second annular perimeter on a second axial side of the inner race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the second annular perimeter of the wall portion and axially toward the first annular perimeter of the wall portion, the wall portion disposed coaxial to and radially within the outer race of the yoke presenting the inner race opposed to the outer race forming the raceway therebetween with the ball bearings being captured in the raceway between the inner race and outer race against removal from the raceway and with the ball bearings coupling the plate to the yoke against uncoupling but journalled for rotation of the plate relative the yoke about the swivel axis, the inner flange portion resisting deformation of the wall portion radially, the outer flange portion resisting deformation of the wall portion radially, the yoke having two spaced legs extending from the annular flange portion axially of the swivel axis on either side of the swivel axis away from the plate, a wheel mounted to the yoke between the legs for rotation about a wheel axis normal to the swivel axis.

2. A caster as claimed in claim 1 wherein the inner flange portion extends radially inwardly from the second annular perimeter of the wall portion beyond the inner race.

3. A caster as claimed in claim 1 wherein the inner flange portion extends radially inwardly from the second annular perimeter of the wall portion at least one half the distance to the swivel axis.

4. caster as claimed in claim 1 wherein the inner flange portion is coaxial about the swivel axis and forms a cup shaped annular disc or bowl member.

5. A caster as claimed in claim 1 wherein the plate is adapted to be mounted to a inner flange portion.

6. A caster as claimed in claim 1 wherein a mounting post member is secured to the inner flange portion, the post extending coaxially of the swivel axis, the post adapted for coupling the caster to a vehicle.

7. A caster as claimed in claim 6 wherein the mounting post member extends axially from the inner flange portion centrally through the wall portion and the outer flange portion.

8. A caster as claimed in claim 1 wherein the plate is adapted to be mounted to a vehicle via the outer flange portion.

9. A caster as claimed in claim 1 wherein the outer flange portion extends radially outwardly from the first annular perimeter of the wall portion beyond the outer race.

10. A caster as claimed in claim 9 wherein the outer flange portion extends radially outwardly from the first annular perimeter of the wall portion as a planar member disposed in a plane normal to the swivel axis.

11. A caster as claimed in claim 1 wherein the first annular perimeter of the wall portion comprises radially outermost portion of the wall portion on the first axial side of the inner race.

12. A caster as claimed in claim 11 wherein the first annular perimeter of the wall portion comprises a radially innermost portion of the outer flange portion.

13. A caster as claimed in claim 1 wherein the second annular perimeter of the wall portion comprises a radially outermost portion of the wall portion on the second axial side of the inner race.

14. A caster claimed in claim 13 wherein the second annular perimeter of the wall portion comprising a radially outermost portion of the inner flange portion.

15. A caster as claimed in claim 1 wherein the plate is folded at the second annular perimeter of the wall portion such that the wall portion and inner flange portion both extend radially inwardly therefrom engaging each other over an annular two-layered area radially inwardly from the second annular perimeter.

16. A caster as claimed in claim 1 wherein the yoke is formed from sheet metal and heat treated to increase its resistance to deformation, the heat treatment carried out after forming the yoke and before assembling the yoke, the plate and the ball bearings.

17. A caster as claimed in claim 1 wherein the caster is manufactured by steps including forming from sheet metal a pre-plate member having:

an annular axially extending pre-wall portion carrying a radially outwardly directed annual ring surface thereon, the pre-wall portion having a first annular perimeter on a first axial side of the ring surface and a second annular perimeter on a second axial side of the ring surface away from the first axial side, the pre-wall portion merging at its first annular perimeter into an outer pre-flange portion extending radially outwardly from the pre-wall portion, the pre-wall portion merging at its second annular perimeter into an annular reinforcing inner pre-flange portion extending radially inwardly from the pre-wall portion, the pre-wall portion on the second side of its first annular perimeter and the inner pre-flange portion each not extending radially beyond a radially inwardly most surface of the ball bearings when received in rolling engagement in the outer race of the yoke, whereby the inner pre-flange portion and pre-wall portion on the second side of its first annular perimeter are insertable axially into the yoke with the ball bearings disposed in the outer raceway, the steps for manufacture further including inserting the inner pre-flange portion and the pre-wall portion on the second side of the first annular perimeter of the pre-plate member axially into the yoke with the ball bearings disposed in the outer raceway, and with the pre-plate member, yoke and ball bearings so disposed, without deforming the yoke applying forces to the pre-plate member to deform the pre-plate member to assume the configuration of the plate by increasing the radial outward extent of both the pre-wall portion on the second side of the first annular perimeter and the inner pre-flange portion thereby forming the inner race and capturing the ball bearings between the outer race and inner race.

18. A caster as claimed in claim 17 wherein the pre-plate member is deformed to assume the configuration of the plate without deformning the outer pre-flange portion of the pre-plate member so that the outer pre-flange portion of the pre-plate member is identical to the outer flange portion of the plate member.

19. A caster as claimed in claim 18 including forming the yoke from sheet metal and heat treating the formed yoke to increase its resistance to deformation, the heat treatment being carried out after forming the yoke and before inserting the pre-plate member axially into the yoke.

20. A caster as claimed in claim 1 wherein the outer race has a plurality of pockets formed therein at circumferentially spaced locations, each pocket receiving one ball bearing therein with the pocket presenting shoulders, one on each side of the ball bearing received in a pocket, each ball bearing being received between the outer race and the inner race constrained in the pocket by the shoulders limiting circumferential movement of the ball bearing relative the outer race.

21. A caster as claimed in claim 1 wherein the inner race has a plurality of pockets formed therein at circumferentially spaced locations, each pocket receiving one ball bearing therein with the pocket presenting shoulders, one on each side of the ball bearing received in a pocket, each ball bearing being received between the outer race and the inner race constrained in the pocket by the shoulders limiting circumferential movement of the ball bearing relative the inner race.

22. A caster as claimed in claim 1 wherein the ball bearings are constrained circumferentially spaced from each other within a bearing cage disposed within the raceway.

23. A caster comprising:

a formed sheet metal plate, a yoke, and a plurality of ball bearings, the plate and yoke each disposed about a swivel axis, the yoke having an axially extending annular wall portion carrying a radially outwardly directed inner race defining a radially inner rolling periphery of a raceway, the plate having an annular axially extending race forming flange portion carrying a radially inwardly directed outer race thereon defining a radially outer rolling periphery of the raceway, the wall portion having a first annular perimeter on a first axial side of the inner race and a second annular perimeter on a second axial side of the inner race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the second annular perimeter of the wall portion and axially toward the first annular perimeter of the all portion, the wall portion disposed coaxial to and radially within the outer race of the plate presenting the inner race opposed to the outer race forming the raceway therebetween with the ball bearings being captured in the raceway between the inner race and outer race against removal from the raceway and with the ball bearings coupling the plate to the yoke against uncoupling but journalled for rotation of the plate relative the yoke about the swivel axis, the inner flange portion resisting deformation of the wall portion radially, the outer flange portion resisting deformation of the wall portion radially, the yoke having two spaced legs extending from the wall portion axially of the swivel axis on either side of the swivel axis away from the plate, a wheel mounted to the yoke between the legs for rotation about a wheel axis normal to the swivel axis.

24. A caster comprising:

a formed sheet metal plate, a yoke, and a plurality of ball bearings, the plate and yoke each disposed about a swivel axis, the plate having an axially extending annular wall portion carrying a radially outwardly directed inner race defining a radially inner rolling periphery of a raceway, the yoke having an annular axially extending race forming flange portion carrying a radially inwardly directed outer race thereon defining a radially outer rolling periphery of the raceway, the wall portion having a first annular perimeter on a first axial side of the inner race and a second annular perimeter on a second axial side of the inner race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the wall portion, the wall portion disposed coaxial to and radially within the outer race of the yoke presenting the inner race opposed to the outer race forming the raceway therebetween with the ball bearings being captured in the raceway between the inner race and outer race against removal from the raceway and with the ball bearings coupling the plate to the yoke against uncoupling but journlled for rotation of the plate relative the yoke about the swivel axis, the inner flange portion resisting deformation of the wall portion radially, the outer flange portion resisting deformation of the wall portion radially, the yoke having two spaced legs extending from the annular flange portion axially of the swivel axis on either side of the swivel axis away from the plate, a wheel mounted to the yoke between the legs for rotation about a wheel axis normal to the swivel axis, a mounting post member is secured to the inner flange portion, the post extending coaxially of the swivel axis, the post adapted for coupling the caster to a vehicle.

25. A caster comprising:

a formed sheet metal plate, a yoke, and a plurality of ball bearings, the plate and yoke each disposed about a swivel axis, the plate having an axially extending annular wall portion carrying a radially outwardly directed inner race defining a radially inner rolling periphery of a raceway, the yoke having an annular axially extending race forming flange portion carrying a radially inwardly directed outer race thereon defining a radially outer rolling periphery of the raceway, the wall portion having a first annular perimeter on a first axial side of the inner race and a second annular perimeter on a second axial side of the inner race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the wall portion, the wall portion disposed coaxial to and radially within the outer race of the yoke presenting the inner race opposed to the outer race forming the raceway therebetween with the ball bearings being captured in the raceway between the inner race and outer race against removal from the raceway and with the ball bearings coupling the plate to the yoke against uncoupling but journalled for rotation of the plate relative the yoke about the swivel axis, the inner flange portion resisting deformation of the wall portion radially, the outer flange portion resisting deformation of the wall portion radially, the yoke having two spaced legs extending from the annular flange portion axially of the swivel axis on either side of the swivel axis away from the plate, a wheel mounted to the yoke between the legs for rotation about a wheel axis normal to the swivel axis, the plate being folded at the second annular perimeter of the wall portion such that the wall portion and inner flange portion both extend radially inwardly therefrom engaging each other over an annular two-layered area radially inwardly from the second annular perimeter.

26. A caster comprising:

a formed sheet metal plate, a yoke, and a plurality of ball bearings, the plate and yoke each disposed about a swivel axis, the plate having an axially extending annular wall portion carrying a radially outwardly directed inner race defining a radially inner rolling periphery of a raceway, the yoke having an annular axially extending race forming flange portion carrying a radially inwardly directed outer race thereon defining a radially outer rolling periphery of the raceway, the wall portion having a first annular perimeter on a first axial side of the inner race and a second annular perimeter on a second axial side of the inner race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the wall portion, the wall portion disposed coaxial to and radially within the outer race of the yoke presenting the inner race opposed to the outer race forming the raceway therebetween with the ball bearings being captured in the raceway between the inner race and outer race against removal from the raceway and with the ball bearings coupling the plate to the yoke against uncoupling but journalled for rotation of the plate relative the yoke about the swivel axis, the inner flange portion resisting deformation of the wall portion radially, the outer flange portion resisting deformation of the wall portion radially, the yoke having two spaced legs extending from the annular flange portion axially of the swivel axis on either side of the swivel axis away from the plate, a wheel mounted to the yoke between the legs for rotation about a wheel axis normal to the swivel axis, the outer race having a plurality of pockets formed therein at circumferentially spaced locations, each pocket receiving one ball bearing therein with the pocket presenting shoulders, one on each side of the ball bearing received in a pocket, each ball bearing being received between the outer race and the inner race constrained in the pocket by the shoulders limiting circumferential movement of the ball bearing relative the outer race.

27. A caster comprising:

a formed sheet metal plate, a yoke, and a plurality of ball bearings, the plate and yoke each disposed about a swivel axis, the plate having an axially extending annular wall portion carrying a radially outwardly directed inner race defining a radially inner wiling periphery of a raceway, the yoke having an annular axially extending race forming flange portion carrying a radially inwardly directed outer race thereon defining a radially outer rolling periphery of the raceway, the wall portion having a first annular perimeter on a first axial side of the inner race and a second annular perimeter on a second axial side of the inner race away from the first axial side, the wall portion merging at its first annular perimeter into an annular reinforcing outer flange portion extending radially outwardly from the wall portion, the wall portion merging at its second annular perimeter into an annular reinforcing inner flange portion extending radially inwardly from the wall portion, the wall portion disposed coaxial to and radially within the outer race of the yoke presenting the inner race opposed to the outer race forming the raceway therebetween with the ball bearings being captured in the raceway between the inner race and outer race against removal from the raceway and with the ball bearings coupling the plate to the yoke against uncoupling but journalled for rotation of the plate relative the yoke about the swivel axis, the inner flange portion resisting deformation of the wall portion radially, the outer flange portion resisting deformation of the wall portion radially, the yoke having two spaced legs extending from the annular flange portion axially of the swivel axis on either side of the swivel axis away from the plate, a wheel mounted to the yoke between the legs for rotation about a wheel axis normal to the swivel axis, the inner race having a plurality of pockets formed therein at circumferentially spaced locations, each pocket receiving one ball bearing therein with the pocket presenting shoulders, one on each side of the ball bearing received in a pocket, each ball bearing being received between the outer race and the inner race constrained in the pocket by the shoulders limiting circumferential movement of the ball bearing relative the inner race.

* * * * *